Figure 1:
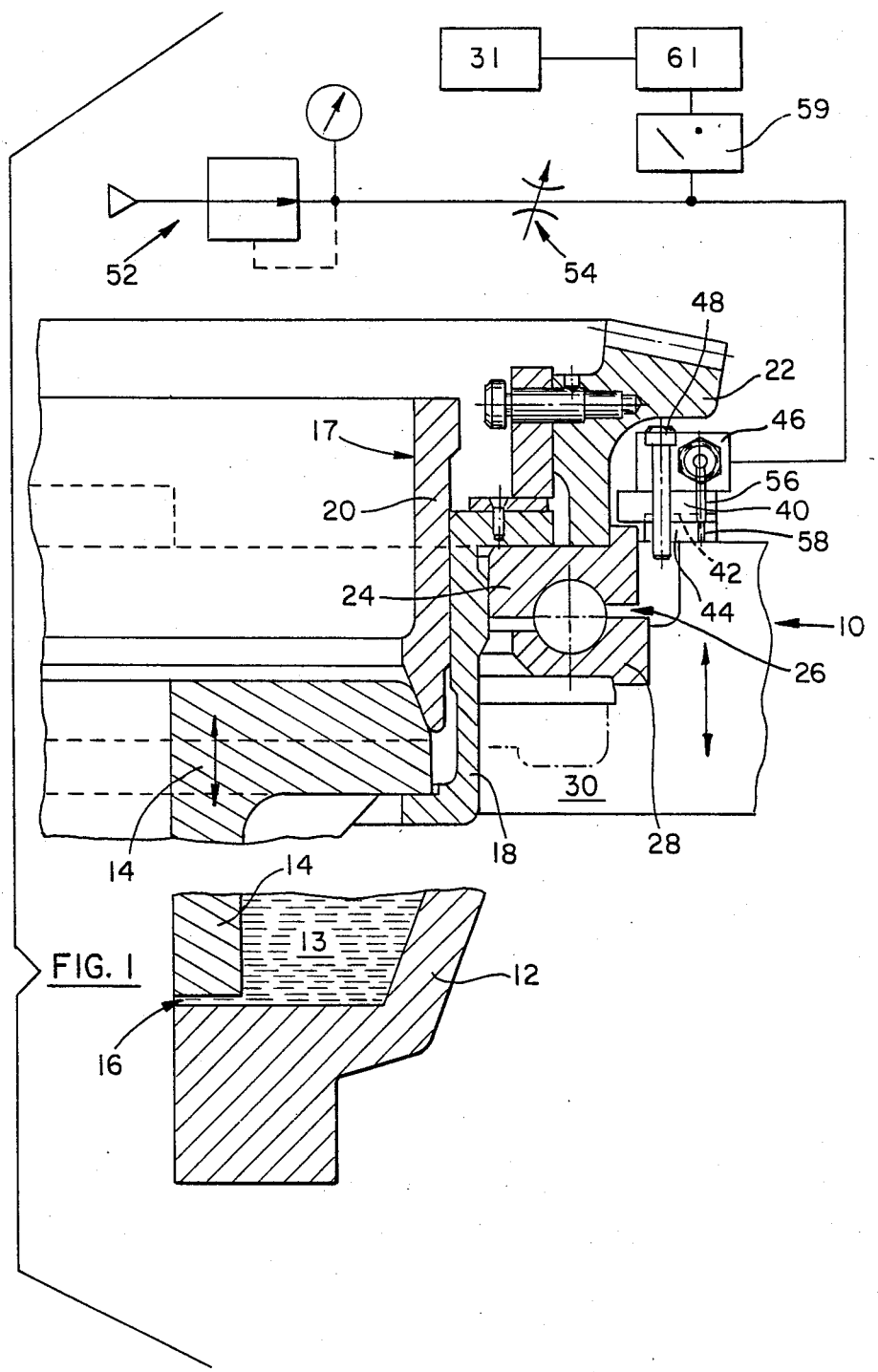

United States Patent [19]

Menard et al.

[11] Patent Number: 4,919,701
[45] Date of Patent: Apr. 24, 1990

[54] FEEDER ASSEMBLY FOR A GLASS CONTAINER MANUFACTURING MACHINE

[75] Inventors: Alan W. Menard, Bolton; John E. Suomala, Simsbury; Richard A. Walker, North Granby, all of Conn.

[73] Assignee: Emhart Industries, Inc., Hartford, Conn.

[21] Appl. No.: 383,950

[22] Filed: Jul. 21, 1989

[51] Int. Cl.⁵ .............................................. C03B 7/08
[52] U.S. Cl. ...................................... 65/158; 65/159; 65/164; 65/325
[58] Field of Search ................. 65/158, 159, 164, 325, 65/328, 330, 331

[56] References Cited

U.S. PATENT DOCUMENTS

| | | | |
|---|---|---|---|
| 4,328,023 | 5/1982 | Vilk | 65/328 |
| 4,551,163 | 11/1985 | Duga et al. | 65/330 |
| 4,554,000 | 11/1985 | Suomala et al. | 65/330 |

Primary Examiner—Joye L. Woodard
Attorney, Agent, or Firm—Spencer T. Smith

[57] ABSTRACT

When the tube of a feeder assembly for a glass forming machine is lowered into engagement with the spout bowl, the separation of the jack and the tube support lifts a ring assembly which normally rests on the jack housing. This exposes a pressurized air conduit resulting in a sensed pressure drop which confirms that the tube has engaged the spout bowl.

2 Claims, 2 Drawing Sheets

FEEDER ASSEMBLY FOR A GLASS CONTAINER MANUFACTURING MACHINE

The present invention relates to machinery for manufacturing glass containers such as bottles in individual section machines, and more particularly, to the feeders which feed molten glass received from a forehearth to these machines.

In such feeders, molten glass is received within a volume defined by an outer spout bowl and an inner rotating tube. The annular horizontal bottom surface of the tube cooperates with a mating spout bowl surface to define a clearance therebetween to control the amount of molten glass flowing from the feeder. Both of these surfaces are made from refractory material, and accordingly, are subject to uneven wear. As a result, even when these surfaces are brought into engagement to discontinue flow from the feeder, flow often continues. Operators seeing the flow often conclude that the tube must be lowered further to engage the spout bowl and further lowering of the already engaged tube may result in damage to either the spout bowl or the tube, and this is undesirable.

It is, accordingly, an object of the present invention to provide a mechanism for preventing such damage due to operator misjudgment.

Other objects and advantages of the present invention will become apparent from the following portion of the specification and from the accompanying drawings, which illustrate, in accordance with the mandate of the patent statutes, a presently preferred embodiment of the invention.

Figure 2:
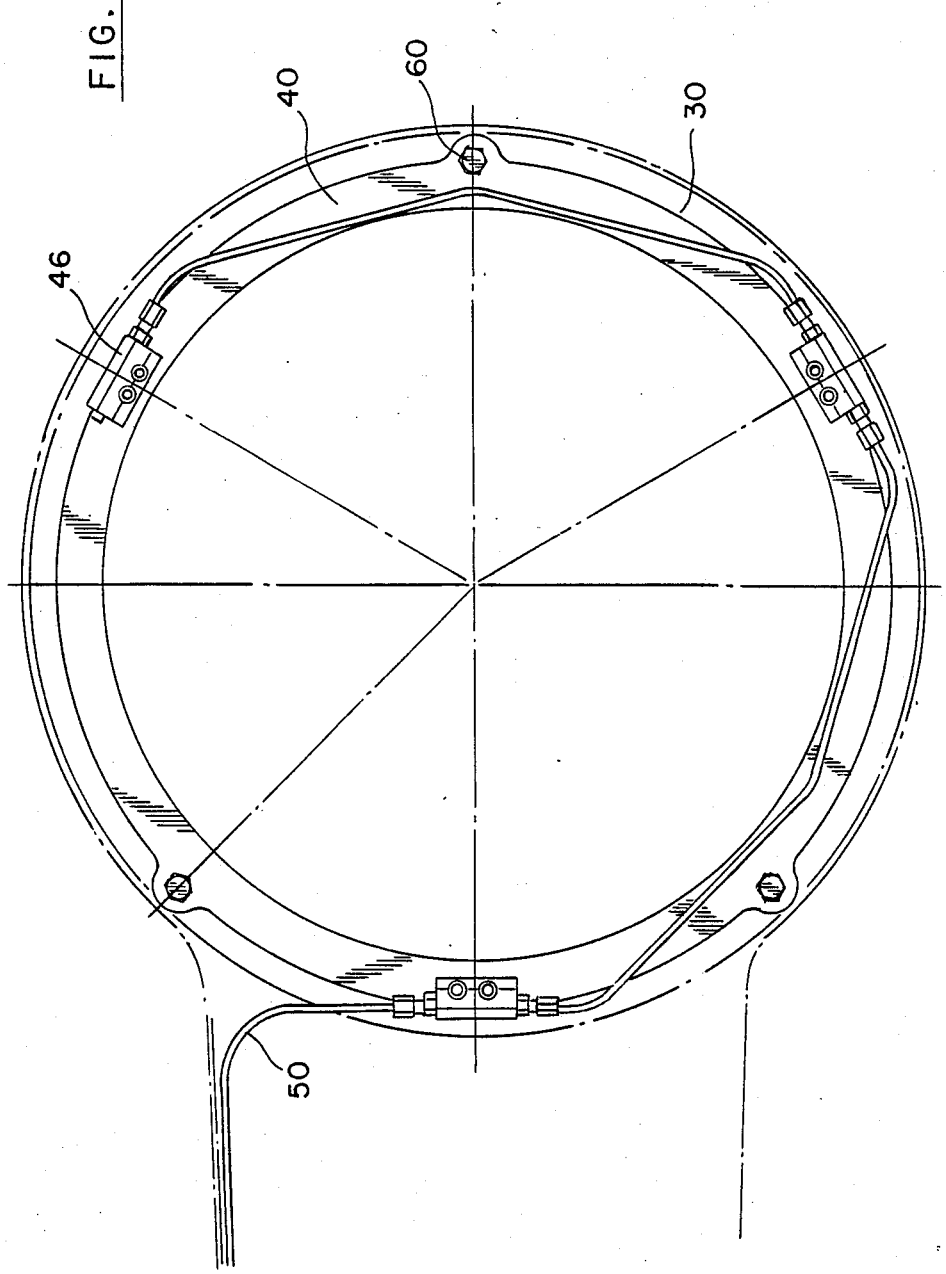

Referring to the drawings:

FIG. 1 is an elevational cross-sectional view of a portion of a feeder for feeding molten glass to an individual section machine or the like made in accordance with the teachings of the present invention; and FIG. 2 is a top view of the ring-shaped switch illustrated in FIG. 1.

The feeder assembly 10 includes a spout bowl 12 into which molten glass 13 is poured. The molten glass is contained within the volume defined between the spout bowl 12 and a central tube 14. By controlling the axial location of the tube 14, an annular clearance 16 can be established between the tube 14 and the spout bowl 12 and a predetermined flow of molten glass will leave the feeder assembly. The tube 14 is supported by a suitable chuck assembly 17 which includes a support frame 18, a clamping member 20, a bevel gear 22 which is driven to rotate the tube 14, and the upper race 24 of an annular thrust bearing 26. All of these structural elements are connected for integral movement. The lower race 28 is supported on a jack housing 30 which is displaceable vertically up and down by a jack motor 31 to raise or lower the tube. Further details of such a feeder assembly are disclosed in U.S. Pat. No. 4,551,163.

A metal actuating ring 40 extends around the chuck assembly 17. A lower surface of the ring 40 has keyways 42 cut therein at three equally spaced locations for receiving flat pads 44 which matingly engage the top horizontal surface of the jack housing 30. At each of these locations a TEE 46 is located on top of the ring 40 and these three elements are secured together by suitable cap screws 48. The TEES 46 receive air via Lincoln tube lines 50 from a source of regulated shop air 52 and through a restrictor 54. The pressurized air passes through the TEE 46 and through continuous holes 56, 58 in the ring 40 and pads 44. During normal operation, the weight of the ring keeps the pads against the housing 30 to block the air passages whereby a pressure switch 59 will sense regulated shop air pressure. Once the jerk housing 30 is lowered to the point that the tube strikes the spout bowl, further lowering of the jack housing with the intention of further lowering the tube will result in relative movement between the upper race 24 which will no longer move and the ring 40 which overlies the race and which, during normal operation, is slightly vertically spaced therefrom. This relative movement causes the upper race 24 to engage the ring 40 lifting it (its pads) off the housing, opening the air hole to the atmosphere. Air pressure at the gauge will rapidly drop causing the gauge to issue a signal to the jack motor controller 61 indicating that the tube has struck the spout bowl to stop further tube advance, thereby preventing damage to the tube. The pads have sufficient size and thickness so that any distortion of the ring due to the high temperature environment will affect only the ring portions intermediate the pads without altering the mating relationship between the pads and the top jack housing surface. The ring is located by shoulder bolts 60 which are located intermediate the pads. These bolts 60 permit vertical movement of the ring.

We claim:
1. A feeder assembly for delivering molten glass to an individual section machine comprising:
   a spout bowl,
   a tube for defining with said spout bowl a selected opening through which molten glass may flow for delivery to the individual section machine,
   an annular thrust bearing having an upper race and a lower race
   unitary tube chucking means for supporting said tube including
      a tube support for supporting said tube,
      a tube clamp for clamping said tube on said tube support,
      the upper race of said thrust bearing extending around said tube support, and
      annular bevel gear means on top of said upper race, and
   jack means for supporting said tube chucking means for vertical displacement, said jack means including said lower race of the thrust bearing,
      jack housing means for supporting said lower race, and
      motor means for displacing said jack housing means,
      said jack housing means having a flat annular horizontal surface,
   annular ring means including a selected plurality of flat pads for matingly resting on said flat annular horizontal surface,
   said annular ring means including portions projecting over said upper race and having a selected vertical spacing therefrom, so that once the tube is lowered into engagement with said spout bowl, continued lowering of said jack housing means will result in at least one of said projecting portions engaging said upper race and lifting at least on of said flat pads off of said flat annular horizontal surface,
   air conduit means extending through each of said pads and through the adjacent ring portion to said flat annular surface, and pressurized air supply means for supplying air under pressure to each of said air conduit means and including means for signalling a drop of pressure which occurs whenever one of said pads is lifted away from said annular surface to indicate that said tube has engaged said spout bowl and motor control means for receiving said signal and stopping the operation of said motor responsive thereto.

2. A feeder assembly according to claim 1, wherein said pressurized air supply means further comprises restrictor means, and tee means communicating with each of said conduit means.

* * * * *